US010867052B1

(12) United States Patent
Kumar et al.

(10) Patent No.: US 10,867,052 B1
(45) Date of Patent: Dec. 15, 2020

(54) ENCRYPTION INTERMEDIARY FOR VOLUME CREATION

(71) Applicant: Amazon Technologies, Inc., Seattle, WA (US)

(72) Inventors: Sandeep Kumar, Sammamish, WA (US); Arvind Chandrasekar, Seattle, WA (US); Lalit Jain, Seattle, WA (US); Danny Wei, Seattle, WA (US); Pavan Kumar Korlepara, Sammamish, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 151 days.

(21) Appl. No.: 16/141,689

(22) Filed: Sep. 25, 2018

(51) Int. Cl.
*G06F 21/60* (2013.01)
*H04L 9/08* (2006.01)
*G06F 3/06* (2006.01)

(52) U.S. Cl.
CPC ............ *G06F 21/602* (2013.01); *G06F 3/064* (2013.01); *G06F 3/067* (2013.01); *G06F 3/0613* (2013.01); *G06F 3/0623* (2013.01); *H04L 9/0819* (2013.01); *H04L 9/0891* (2013.01)

(58) Field of Classification Search
CPC .... G06F 21/602; G06F 3/0613; G06F 3/0623; G06F 3/064; G06F 3/067; H04L 9/0819; H04L 9/0891
See application file for complete search history.

(56) References Cited

U.S. PATENT DOCUMENTS

| 8,166,314 | B1 | 4/2012 | Raizen |
| 8,261,068 | B1 | 9/2012 | Raizen |
| 8,375,437 | B2 * | 2/2013 | Linsley ................... G06F 21/53 726/15 |
| 8,687,814 | B2 * | 4/2014 | Nord ....................... G06F 21/78 380/286 |
| 9,892,265 | B1 * | 2/2018 | Tripathy ............... G06F 9/4406 |
| 2011/0276806 | A1 * | 11/2011 | Casper .................... G06F 21/78 713/189 |
| 2012/0297206 | A1 * | 11/2012 | Nord ....................... G06F 21/78 713/193 |
| 2014/0068279 | A1 | 3/2014 | Kurspahic et al. |

(Continued)

OTHER PUBLICATIONS

International Search Report for PCT Application No. PCT/US2019/025590 dated Jul. 15, 2019.

(Continued)

*Primary Examiner* — Oleg Korsak
(74) *Attorney, Agent, or Firm* — Knobbe, Martens, Olson & Bear, LLP

(57) ABSTRACT

Generally described, one or more aspects of the present application correspond to techniques for modifying volume encryption status, either by creating an encrypted copy of an unencrypted source volume or by re-encrypting the replica with a different key than the source volume. This can be accomplished using an intermediary transform fleet that stores the encryption key(s) and performs encryption (and decryption, in cases where the source is encrypted). Further, these techniques can implement a state refresh for any client attached to the volume in order to equip the client to handle the different encryption state of the encrypted volume.

20 Claims, 6 Drawing Sheets

(56) References Cited

U.S. PATENT DOCUMENTS

| | | | |
|---|---|---|---|
| 2014/0229729 A1* | 8/2014 | Roth | G06F 21/6218 |
| | | | 713/153 |
| 2017/0142076 A1 | 5/2017 | Ford et al. | |
| 2018/0295105 A1* | 10/2018 | Feng | H04W 4/80 |
| 2019/0319785 A1* | 10/2019 | Kumar | H04L 9/0631 |

OTHER PUBLICATIONS

Anonymous, AWS Key Management Service Concepts, Dec. 16, 2017, Retrieved from the Internet: URL:https://web.archive.org/web/20171216063915/http://docs.aws.amazon.com/kms/latest/developergide/concepts.html#encrypt_context; 5 pages.

* cited by examiner

ENCRYPTION INTERMEDIARY FOR VOLUME CREATION

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively infrastructure of on-premises computing environments, requires a system architecture that can reliably re-allocate its hardware according to the changing needs of its user base.

DETAILED DESCRIPTION

Figure 1:
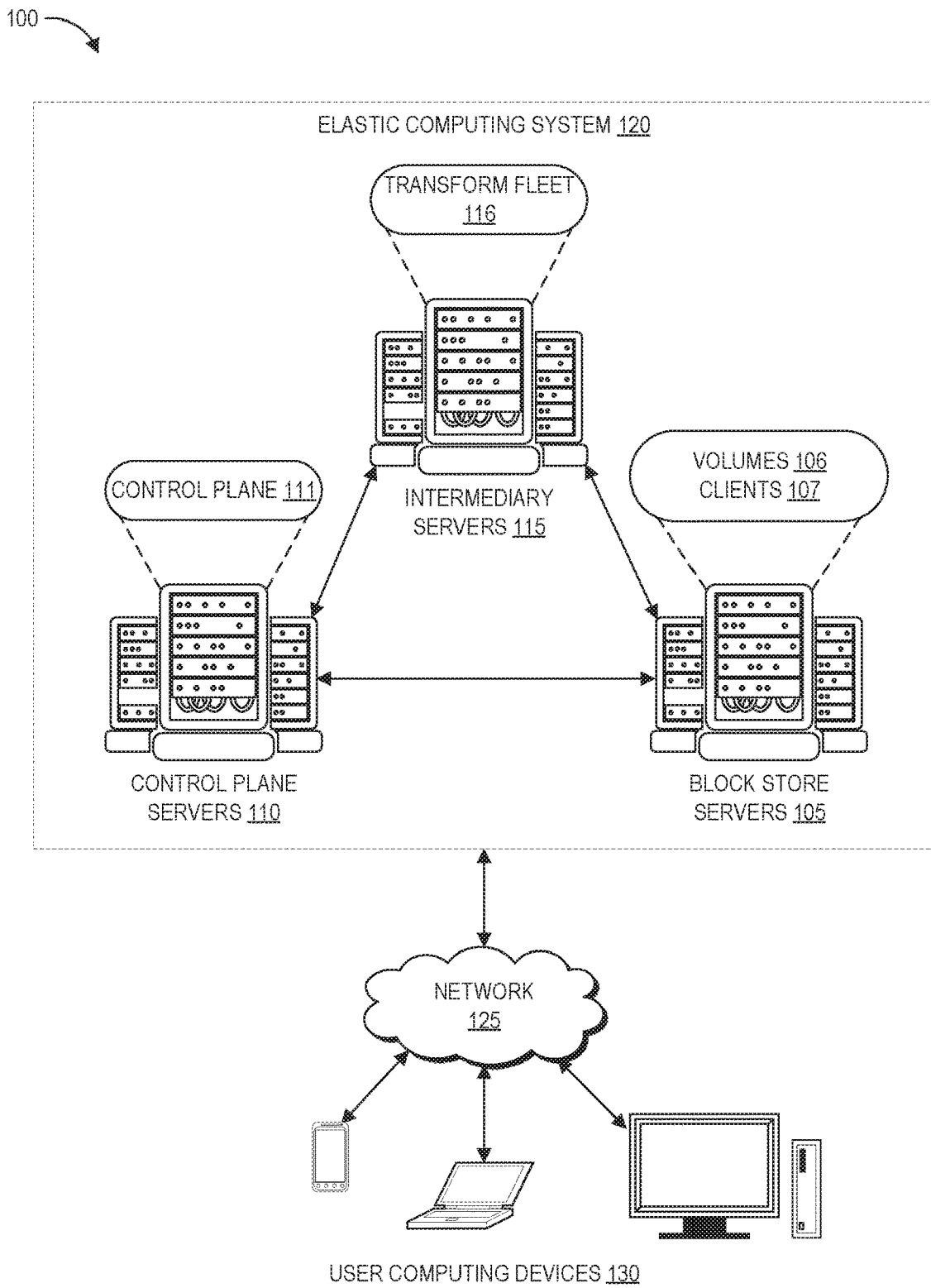
FIG. 1 depicts a schematic diagram of an elastic computing system in which various embodiments according to the present disclosure can be implemented.

Generally described, the present disclosure relates to creating encrypted copies of encrypted or unencrypted block store volumes. Users may store volumes of data in an unencrypted state, and may request to modify the encryption status of that volume to be encrypted. In other scenarios, users may request to modify the encryption status of an encrypted volume, for example if they believe that their initial encryption key has been compromised and they prefer to re-encrypt the volume with a new key. These requests to modify the encryption status can be handled by creating a copy ("target volume") of the initial source volume, with blocks of the target volume being encrypted using a new encryption key. However, these volumes are often stored on multi-tenant computing devices that host data for different user accounts and thus are able to accept client requests from a number of different clients on behalf of a number of different users. Accordingly, it may not be secure to perform encryption locally on the computing device that stores either the source volume or the encrypted target volume, as this would require storage of a particular user's encryption key on computer hardware that can accept connection requests from other users. Further, the source volume that provides data to the target volume can initially support user reads and writes (input/output operations, or "I/O operations"), and any client connected to that source would not have the information needed to decrypt data of the encrypted target volume. The client may need to decrypt the data in order to handle the I/O operations, which can require access to the unencrypted version of the data. Even if the source volume has an initial encryption scheme, the client would only be equipped to decrypt according to that encryption scheme, and not according to the updated encryption scheme of the new volume.

The aforementioned problems, among others, are addressed in some embodiments by the disclosed techniques for using an intermediary transform fleet to modify the encryption status of a volume, together with a protocol for refreshing client-persisted metadata about the attached volume. Specifically, a client that accesses a volume (e.g., software that handles user I/O to the volume, or provides block store access to a computing instance that accesses data of the volume) can persist certain attributes representing the state of the volume. These attributes can include an encryption parameter that indicates whether or not the volume is encrypted and, if so, an encryption key to use for decrypting data of the volume. Once computer hardware is configured to store the new encrypted volume, any client attached to the source volume can reattach to the new encrypted volume, delete the previously stored state of volume attributes, and rebuild the volume state based on information from a control plane. From a user perspective, the identity of the "volume" (e.g., their virtual computer storage or block store) can stay the same after the encryption change, as the data of the encrypted volume is a copy of the original data. However, from a system perspective the encrypted volume is a different resource within the computing system from the source volume. Thus, a client may use the metadata refresh to switch its view of which resource is being accessed as the user-facing virtual storage, potentially without the end user being aware that any change in the state of the volume has occurred.

Rebuilding the volume state can include learning the attribute values of the new encrypted volume from a control plane that orchestrates the encryption modification, including the encrypted status. Further, the client can request the encryption key from a key management service that selectively provides encryption keys to authorized computing entities. Accordingly, the client is able to reattach to the new encrypted volume and perform the refresh protocol that enables the client to decrypt the volume data, now stored in the newly encrypted volume. A used herein, attachment refers to the network connection between a client and a particular block store of data, such that the client can access the block store data. For example, the client (e.g., the software that performs reads and writes to a block store to transform it into a virtual hard drive for a user or processing instance) can receive a volume identifier and be told that there is an attachment request (e.g., volume to instance). The control plane can generate metadata describing the volume and forward credentials of the user of the volume to the processing instance to act on behalf of the user. The client then establishes a connection with the servers that store the block mapping of data, and the connection between client and server stays open until terminated. As such, a state of being "attached" refers to a network connection being open between the client and block store for I/O.

The disclosed encryption techniques can use a dedicated intermediary between the source volume and the encrypted replica for performing the encryption. The intermediary can be a transform fleet that operates as part of the control plane of the computing system. Because block store servers that host user-accessible volumes can be multi-tenanted, in one embodiment, encryption keys are not sent to the block store servers for security reasons. Further, in some embodiments, the block store servers are not provided with any data indicating the encryption status of volumes stored on such servers (e.g., a volume may not be stored with any information indicating that it is encrypted or how it is encrypted). The transform fleet can act as an intermediary that fetches data from a source volume, applies the appropriate encryption (and decryption, if necessary), and then sends the encrypted data to a target volume. The transform fleet can be provided with the encryption keys required for the encryption (or re-encryption) process. Further, any client connected to the source volume can undergo an update process by which it attaches to the new encrypted volume and receives the needed information for performing decryption.

The disclosed technology beneficially provides a mechanism for encrypting a volume while minimizing exposure of the encryption information. For example, the transform fleet can store encrypted keys in a trusted platform module ("TPM"). Decryption of these encrypted keys may require authorization from a key management resource, such that the transform fleet and/or source volume may require configuration as an approved entity to receive the decrypted contents of an encryption key (referred to as a "data key"). Data keys may be stored in volatile memory such that they are erased upon reset of the hardware performing encryption. Further, the encryption keys (in encrypted and decrypted form) can be stored in separate hardware from the hardware configured to store the target volumes. In addition, the transform fleet can be configured not to accept client requests, such that the encryption keys are shielded on the intermediary servers from potential malicious access.

As used herein, encryption context can refer to information that identifies a set of key-value pairs used for encryption and decryption operations within the elastic computing system, and can also include a grant token on the encryption key and/or an encryption status flag, which in the disclosed techniques would be set to "encrypt" or potentially "transcode." Generally, an encryption key refers to any value (e.g., a string of alphanumeric characters) that can be used to encrypt data. Although the encryption context is not included in an encrypted target volume, it is cryptographically bound to the encrypted volume during encryption and must be passed again when a user or the system calls for decryption or re-encryption. Decryption only succeeds if the encryption context passed for decryption is exactly the same as the encryption context used during encryption. The intermediary used to create encrypted volumes and any volume data stored thereon can be hidden from the end user, meaning for example that users cannot perform reads and writes to data stored at these intermediaries, and/or that users are not otherwise made aware of the existence of volume data stored at the intermediaries. Beneficially, the use of such intermediary hardware avoids storing the key and the encrypted data on the same computer hardware.

As would be appreciated by one of skill in the art, refreshing client metadata about connected volumes, as disclosed herein, represents a significant technological advance over prior implementations. Specifically, this enables the client to switch from using an unencrypted (or differently encrypted) volume for handling user I/O to using an encrypted volume for handling I/O, with minimal or no noticeable difference to the user to whom the client serves data. From the perspective of a user interacting with their virtual storage or block store, the volume can appear to be the same volume but with a different encryption status. However, from the perspective of the computing system, the volume changes from a first set of servers hosting a first type of volume to a second set of servers hosting a differently encrypted, new volume. The disclosed metadata refresh provides the client with the information needed to successfully attach to this new resource, while from the perspective of the user the metadata refresh can yield a seamless transition that may appear as if nothing has changed. Beneficially, the user is not required to manually configure the client with any information about the new resource that represents their volume in the computing system. Further, the use of intermediary hardware to enable encryption, as disclosed herein, represents a significant technological advance over prior implementations. Specifically, the disclosed techniques result in compliance with data protection regulations without exposing secure encryption keys to multi-tenant aspect. For example, the use of a dedicated intermediary hardware for performing encryption isolates the encryption context from the hardware used to store the encrypted volume. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, although the encryption techniques are described with respect to encryption, they can also be used for transcoding where the type of encryption changes between the source data and the encrypted data. Further, although the disclosed techniques are at times described with respect to block-level encryption of volume data, they can equally be applied to encryption of other formats of data. In addition, although described in the context of an elastic computing system, the disclosed encryption-by-default techniques can be implemented in other suitable data-hosting networked computing environments. It will also be appreciated that, although the disclosed examples are initiated when a user requests modification of their volume encryption status, in other implementations the system can automatically undertake the encryption process, for example to comply with data protection regulations or if a particular encryption key has had a known security breach.

Overview of Example Computing Environment with Intermediary Transform Fleet

FIG. 1A depicts an example computing environment 100 including an elastic computing system 120 in which the disclosed encryption and client attachment techniques can be implemented. The elastic computing system 120 can be accessed by user devices 130 over a network 125. The elastic computing system 120 includes one or more control plane servers 110, one or more block store servers 105, and one or more intermediary servers 115 that are in networked communication with one another and with the network 125 to provide users with on-demand access to computing resources including volumes 106, among others. These particular resources are described in further detail below. Some implementations of elastic computing system 120 can additionally include elastic compute servers providing computing resources (referred to as "instances"), storage of backup copies of data (referred to as "snapshots"), domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The elastic computing system 120 can provide on-demand, scalable computing platforms to users through the network 125, for example allowing users to have at their disposal scalable instances, such as "virtual computing devices" via their use of the object storage servers 110 and block store servers 105. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). Users can connect to their virtual computing device using a secure shell ("SSH") application, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The elastic computing system 120 can communicate over network 125 with user devices 130. The network 125 can include any appropriate network, including an intranet, the Internet, a cellular network, a local area network or any other such network or combination thereof. In the illustrated embodiment, the network 125 is the Internet. Protocols and components for communicating via the Internet or any of the other aforementioned types of communication networks are known to those skilled in the art of computer communications and thus, need not be described in more detail herein.

User computing devices 130 can include any network-equipped computing device, for example desktop computers, laptops, smartphones, tablets, e-readers, gaming consoles, and the like. Users can access the elastic computing system 120 via their computing devices 130, over the network 125, to view or manage their data and computing resources, as well as to use websites and/or applications hosted by the elastic computing system 120.

Turning specifically to the roles of the different servers within the elastic computing system 120, the block store servers 105 provide persistent data storage in the form of volumes 106. The block store servers 105 include one or more servers on which data is stored in as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. The block store servers 105 are configured to mirror the content of block devices between servers 105 and synchronously replicate data across redundant servers. For example, the block store servers 105 can have built-in redundancy for volumes by replicating the volume 106 across multiple servers (e.g., a primary replica and a synchronous secondary replica), which means that volumes will not fail if an individual drive fails or some other single failure occurs. The primary and secondary replicas can support user I/O operations, and thus the block store servers 105 can be accessible to the user computing devices 130 over the network 125.

User volumes 106, which can be treated as an individual hard drive ranging for example from 1 GB to 1 terabyte TB in size, are made of one or more blocks stored on the block store servers 105. Although treated as an individual hard drive, it will be appreciated that the hardware storing a volume may not actually be a hard drive, but instead may be one or more virtualized devices implemented on one or more underlying physical host devices. Volumes may be partitioned a number of times (e.g., up to 16) with each partition hosted by a device of the elastic computing system 120. In FIG. 1A, these volumes are shown as source volumes 116 and target volumes 118. The block store servers 105 can store other types of volumes, for example original user volumes of data.

Users can instruct the elastic computing system 120 to replicate or modify their volumes stored on the block store servers 105, including requests to modify the encryption state of the volume as described herein. Generally, a target volume refers to a block store volume, the data of which has been (or is being) copied from another resource of the elastic computing system 120, and that is available to handle user reads and writes. Target volumes will typically follow the partitioning of the origin volume from which their data is copied. A source volume refers to this origin volume, the data of which will be copied to create a target volume. It will be appreciated that the source and target volumes may share the same volume ID. The source volume may have previously handled user I/O operations, however it may be disabled from handling I/O operations in favor of using the encrypted volume, as described in further detail below.

Different subsets of the block store servers 105 can store the source volumes and the target volumes, such that the intermediary servers 115 can be positioned within the elastic computing system 120 as an intermediary between the subset of servers hosting source volumes and the subset of servers configured to host the target volume. Typically, communications between the block store servers 105 can be governed by an elastic volume hydration protocol in which the hardware of the target volume directly requests blocks of data from the hardware of the source volume. However, in order to perform encryption on the target volume, these direct communications between block store servers 105 would require that the encryption context be stored on one of the sets of block store servers 105. As described above, this may create security issues due to the multi-tenant nature of the block store servers 105.

The block store servers 105 also host client 107. A client refers to the software running on the block store servers 105 that performs reads and writes to a block store for example I/O from a user or processing instance, in order to create a virtual hard drive using the block store. The client software can be instructed to attach to a particular volume ID, and may maintain metadata reflecting the state of that volume in order to enable the client to perform I/O on the volume data. As described herein, the client may rebuild this metadata when volume encryption state changes in order to facilitate continued I/O. Further, the client can reattach from the source volume to the target volume to handle I/O using the new target volume.

The intermediary servers 115 host a transform fleet 116 that can perform on-demand encryption of volumes within the elastic computing system 120, and thus may store the encryption keys of encrypted volumes as described herein. Further, in implementations in which the source volume is encrypted using a different key, the intermediary servers 115 can store the different encryption key for use in decrypting the source data prior to re-encryption. In order to preserve the security of these encryption keys, the intermediary servers 115 is, in some embodiments, not accessible to the user computing devices 130. For example, the intermediary servers 115 may be configured not to accept connection requests from clients, such as clients that handle user I/O operations as described above. The transform fleet 116 is a logical construct that can be implemented to encrypt volume data as described herein.

The transform fleet 116 can also create a transform instance (e.g., a processing resource within the system 120, such as a virtual machine, software-isolated environment, etc.) for each target volume that it will hydrate. The transform instance can receive the block requests from the corresponding encrypted target volume, and can draw upon the source volume for the data of the particular requested block. After encryption on the servers 115 storing the transform fleet 116, the encrypted data is sent to the new encrypted volume (e.g., as hosted by the block store servers 105).

One or more control plane servers 110 may hosts a control plane 111 for coordinating operation of the elastic computing system 120. In accordance with the present disclosure, the control plane 111 is a logical construct that can be implemented by at least one server 110 with computer-executable software for coordinating system and user requests and propagating them to the appropriate servers in the elastic computing system 120. Functions of the control plane 111 can include, for example, replication of data, failover operations, and receiving requests from users for specific actions to be performed with respect to their hosted virtual computing devices. These can include creating, cloning, and snapshotting volumes 106. Further, functions of the control plane 111 can include communicating with clients attached to volumes in order to provide them with state information regarding the volumes.

Figure 2:
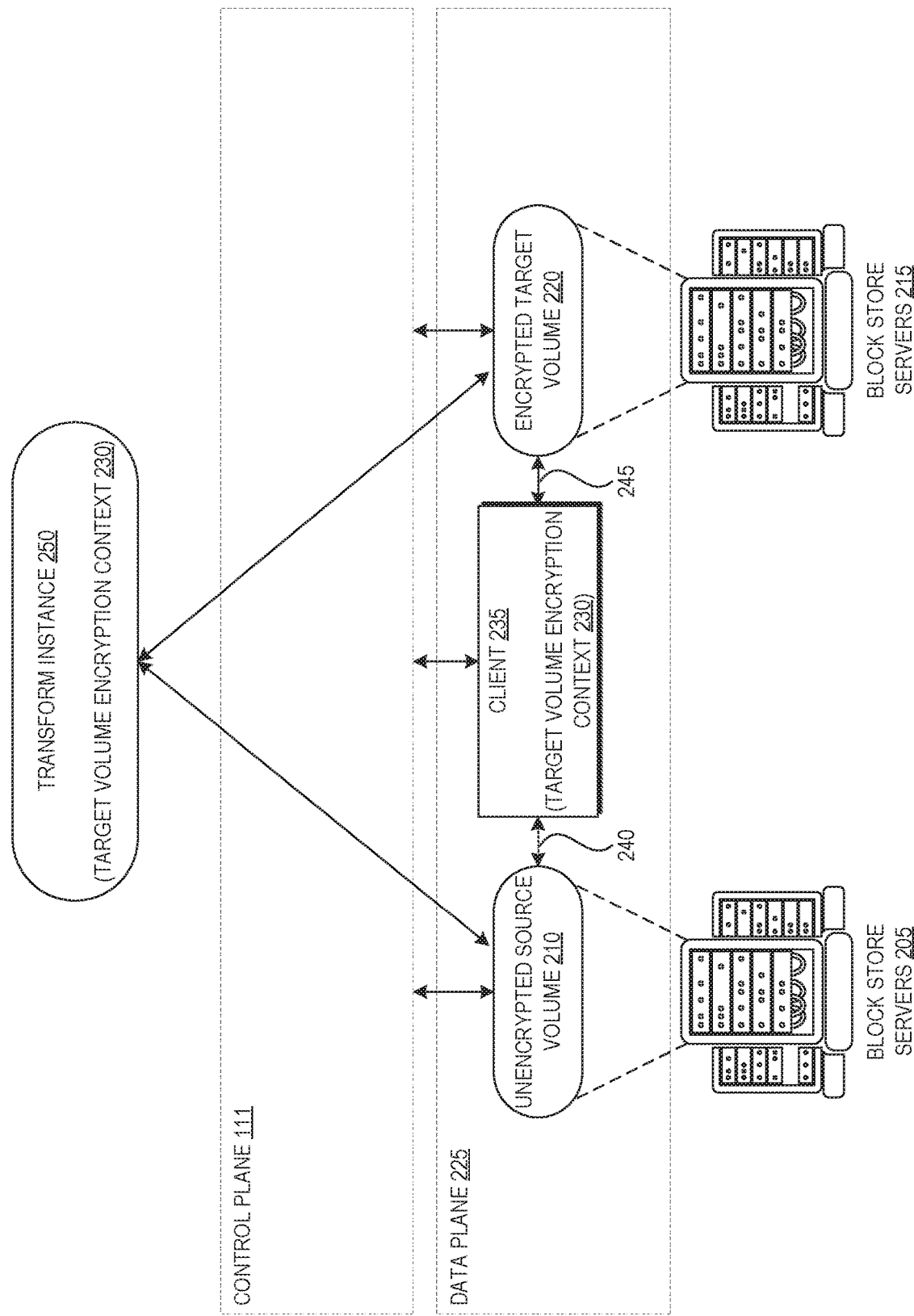
FIG. 2 depicts a first schematic diagram of data instances for modifying volume encryption state within the elastic computing system of FIG. 1, according to the present disclosure.

FIG. 2 depicts an example of how the block store servers 105, intermediary servers 115, and control plane servers 110 can be configured to duplicate data from a source volume 210 into an encrypted target volume 220, according to certain embodiments of the present disclosure in which the source volume 210 is unencrypted. For simplicity of the drawing, FIG. 2 shows the transform instance 250 and control plane 110 but omits the control plane servers 110 and the intermediary servers 115, which are shown in FIG. 1. FIG. 2 also depicts a data plane 225 and the control plane 111 of the elastic computing system 120. The data plane 225 represents the movement of user data through the elastic computing system 120, while the control plane 111 represents the movement of control signals through the elastic computing system 120. The data plane 225 in the illustrated embodiment is implemented by execution of operations on the unencrypted source volume 210 and the encrypted target volume 220 via the client 235.

As described above, different sets of the block store servers 105 can store the unencrypted source volume 210 and the encrypted target volume 220, depicted in FIG. 2 as the block store servers 205 that store the unencrypted source volume 210 and the block store servers 215 that are configured to store the encrypted target volume 220. The block store servers 215 are configured by the control plane 111 to store the encrypted target volume 220 as a replica of the unencrypted source volume 210 by having the same partitions and other data structures.

The transform instance 250 is a particular instance of the transform fleet 116 that is created to be positioned as an intermediary between the block store servers 205 hosting the unencrypted source volume 210 and the block store servers 215 that are configured to store the encrypted target volume 220. The transform instance 250 stores the target volume encryption context 230 (e.g., information regarding the encryption as well as the encryption key), thereby isolating it from the multi-tenant block store servers 205, 215. The block store servers 215 can request blocks of the volume data from the transform instance 250. The transform instance 250 can access the requested data from the block store servers 205 that store the unencrypted source volume 210, apply encryption based on the target volume encryption context 230, and send the encrypted data to the block store servers 215 to create the encrypted target volume 220.

FIG. 2 also depicts the client 235 that accesses the block data of the volume, for example to handle user I/O operations with respect to the volume. The client can run on the block store servers 205, 215 or other ones of the block store servers 105. Thus, the client 235 can interface between a user computing device 130 and the block store volume, or between another resource of the elastic computing system 120 (such as a computing instance) and the block store volume. In such implementations, "user I/O" can be reads and writes to the data of the volume from this other computing resource. The process by which the client 235 establishes a data link with a volume is referred to herein as "attaching." As shown by the dashed attachment arrow 240, the client 235 is initially attached to the unencrypted source volume 210. However, after the client 235 requests to modify the encryption status of the volume, the client 235 severs its attachment to the unencrypted source volume 210 and reattaches to the encrypted target volume 220. The client 235 will then use this attachment 245 to the encrypted target volume 220 to handle user I/O. Thus, from the perspective of the user they continue interacting with the same volume, but the client has detached from the initial version of the volume with its initial encryption state and has reattached to the new version of the volume with its modified encryption state. In order to seamlessly transition into the new attachment to the encrypted target volume 220, the client 235 refreshes the metadata that it persists to maintain the attachment, as described herein. In this implementation, refreshing the metadata indicates to the client 235 that the encryption state has flipped from unencrypted to encrypted, and also provides the client 235 with the target volume encryption context 230 that is needed to decrypt the encrypted target volume 220.

Figure 3:
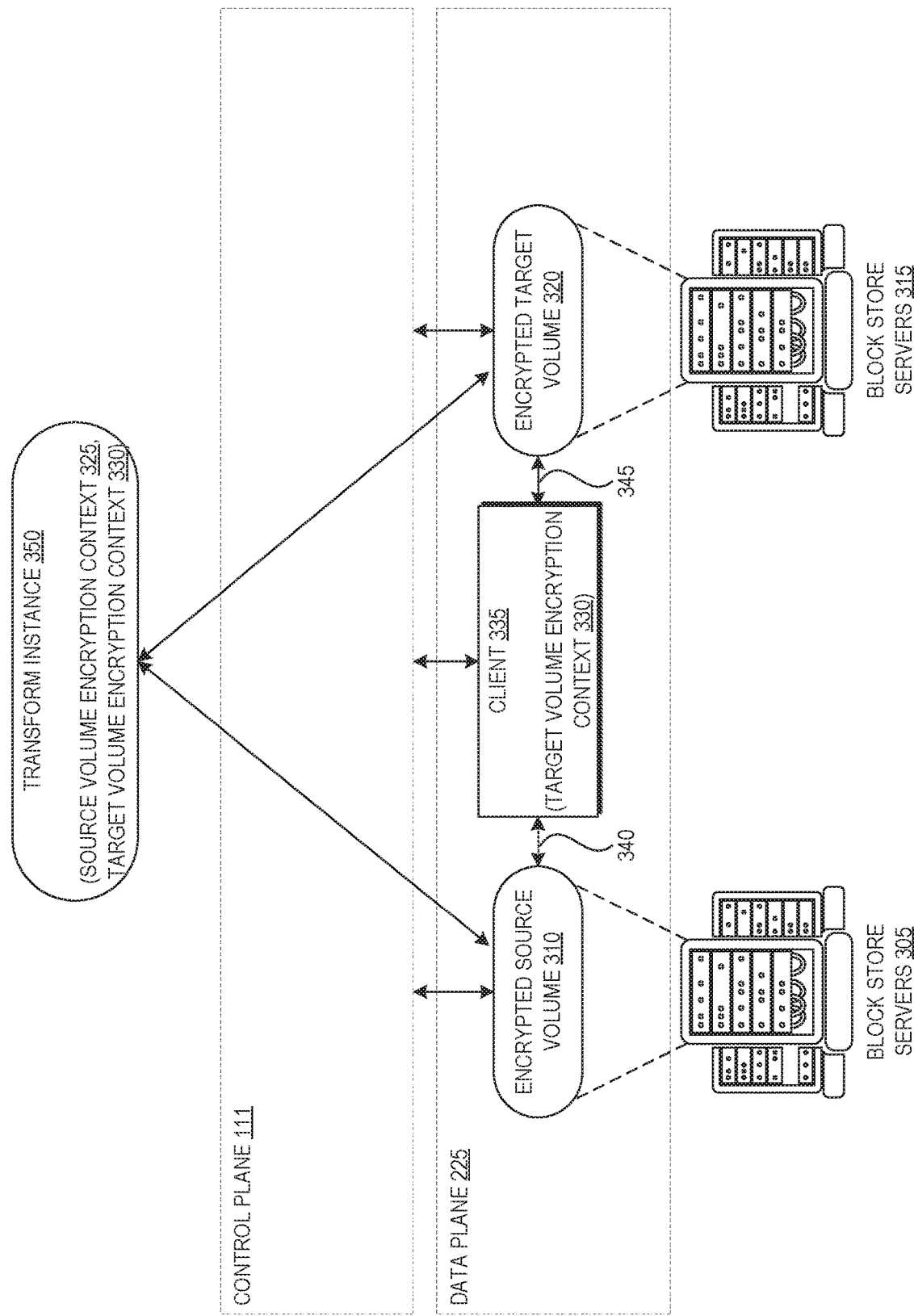
FIG. 3 depicts a second schematic diagram of data instances for modifying volume encryption state within the elastic computing system of FIG. 1, according to the present disclosure.

FIG. 3 depicts another example of how the block store servers 105, intermediary servers 115, and control plane servers 110 can be configured to replicate encrypted data, according to certain embodiments of the present disclosure in which the source volume 310 is encrypted using a different encryption key (or different type of encryption) from the target volume 320. For simplicity of the drawing, FIG. 3 shows the transform instance 350 and control plane 110 but omits the control plane servers 110 and the intermediary servers 115, which are shown in FIG. 1. FIG. 3 also depicts the data plane 225 and the control plane 111 of the elastic computing system 120. The data plane 225 in the illustrated embodiment is implemented by execution of operations on the encrypted source volume 310 and the encrypted target volume 320.

As described above, different sets of the block store servers 105 can store the encrypted source volume 310 and the encrypted target volume 320, represented in FIG. 3 by the block store servers 305 that store the unencrypted source volume 310 and the block store servers 315 that are configured to store the encrypted target volume 320. The block store servers 315 are configured by the control plane 111 to store the encrypted target volume 320 as a duplicate (or "mirror") of the encrypted source volume 310 by having the same partitions and other data structures.

The transform instance 350 is a particular instance of the transform fleet 116 that is created to be positioned as an intermediary between the block store servers 305 hosting the encrypted source volume 310 and the block store servers 315 that are configured to store the encrypted target volume 320. In this implementation, the transform instance 350 stores both the source volume encryption context 325 and the target volume encryption context 230, thereby isolating this sensitive data from the multi-tenant block store servers 305, 315. The block store servers 315 can request blocks of data of the volume from the transform instance 350. The transform instance 350 can access the requested data from the block store servers 305 that store the encrypted source volume 310, decrypt the data using the source volume encryption context 325, apply encryption based on the target volume encryption context 330, and send the encrypted data to the block store servers 315 to create the encrypted target volume 320.

FIG. 3 also depicts the client 335 that accesses the block data of the volume, for example to handle user I/O operations with respect to the volume. The client can run on the block store servers 305, 315 or other ones of the block store servers 105. As described above, the client 335 can handle I/O to the volume from a user or another attached computing resource. As shown by the dashed attachment arrow 340, the client 335 is initially attached to the encrypted source volume 310. However, after the client 335 requests to modify the encryption status of the volume, the client 335 severs its attachment to the encrypted source volume 310 and reattaches to the encrypted target volume 320. The client 335 will then use this attachment 345 to the encrypted target volume 320 to handle user I/O. In order to seamlessly transition into the new attachment to the encrypted target volume 320, the client 335 refreshes the metadata that it persists to maintain the attachment, as described herein. In this implementation, refreshing the metadata provides the client 335 with the target volume encryption context 330 that is needed to decrypt the encrypted target volume 320.

Overview of Example Target Volume Creation Techniques

Figure 4A:
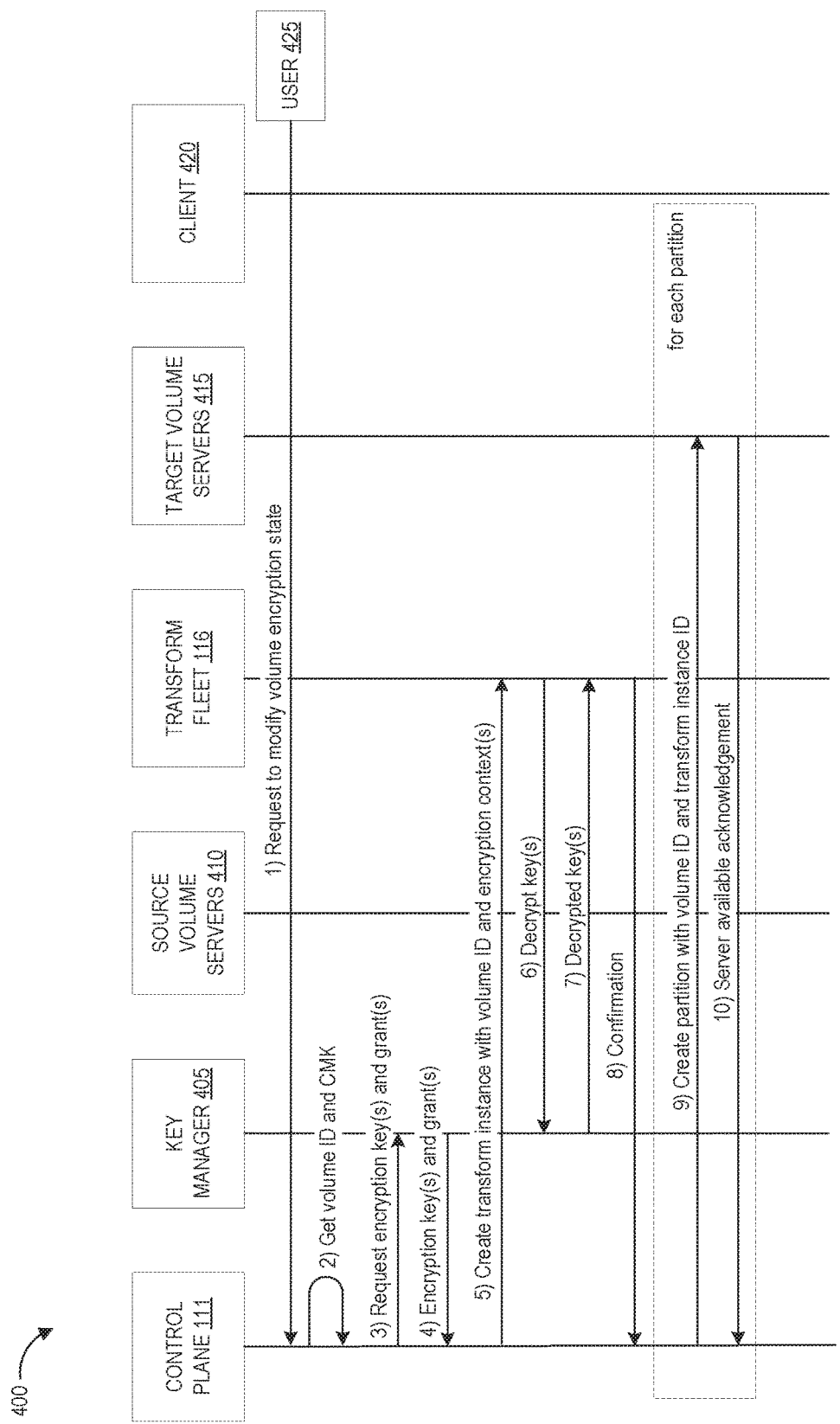
FIGS. 4A through 4C depict a schematic diagram of a workflow for modifying volume encryption state within the elastic computing system of FIG. 1.
Figure 4B:
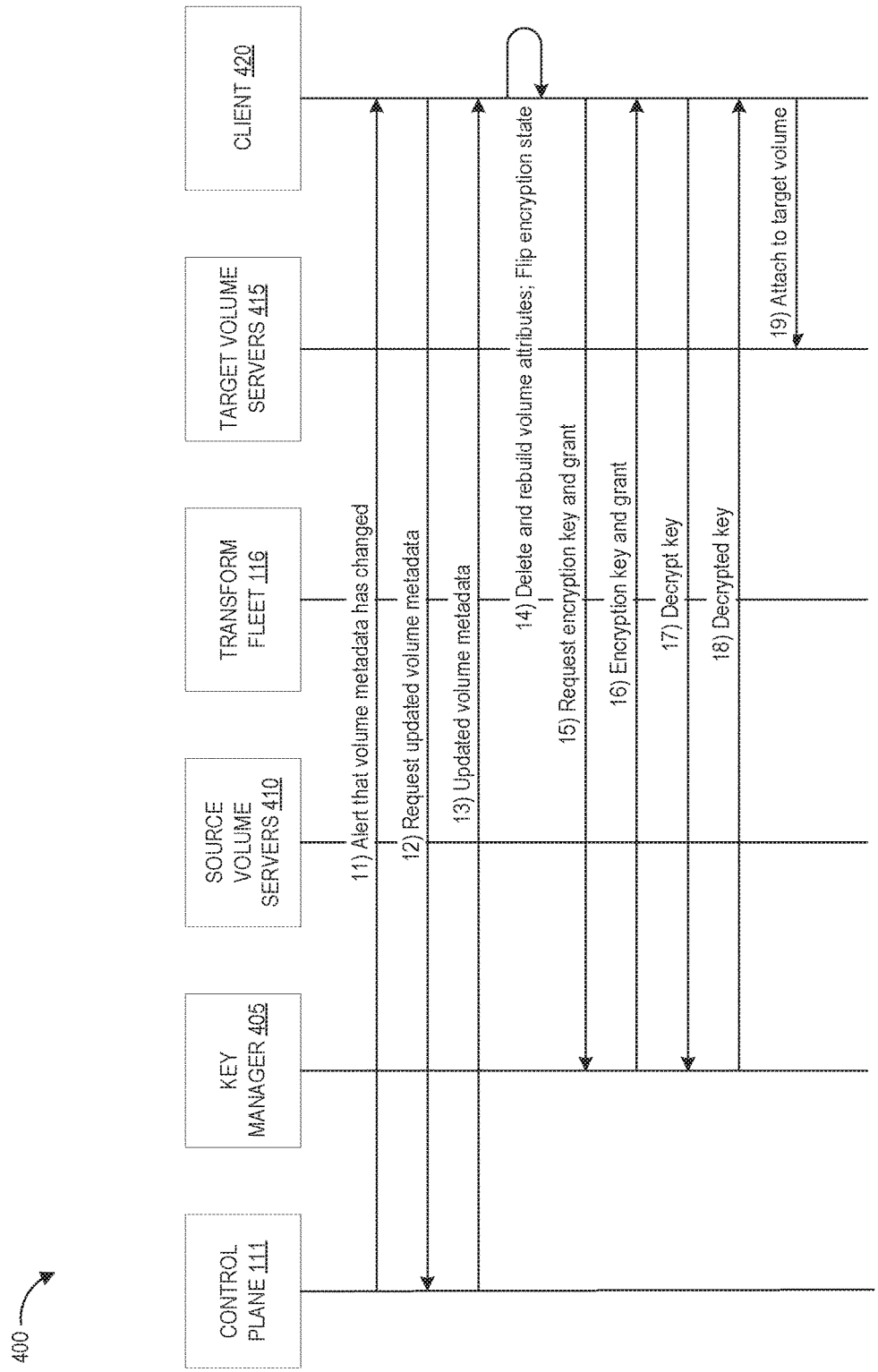
Figure 4C:
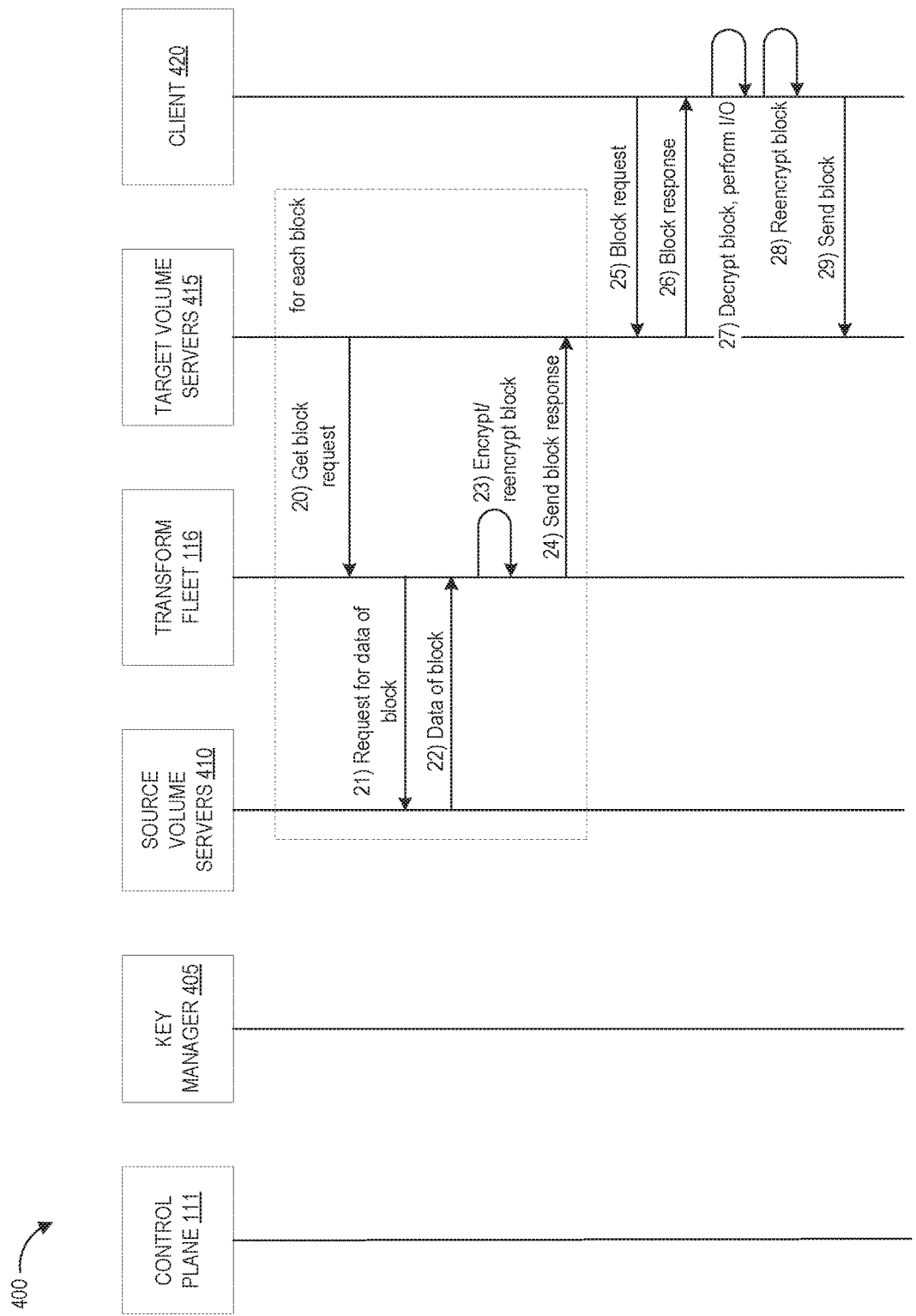

FIGS. 4A-4C collectively depict a schematic diagram of a workflow for creating an encrypted volume within the elastic computing system of FIG. 1. Specifically, FIGS. 4A and 4B depict data communications between the control plane 111, transform fleet 116, key manager 405, source volume servers 410, target volume servers 415, and client 420 for the disclosed volume encryption state modification techniques. The source volume servers 410 and target volume servers 415 can be different subsets of the block store servers 105, with the particular number of servers in each subset corresponding to the number of partitions of the volume in some implementations. The client 420 can represent the module of computer-executable instructions running on a block store server 105 that handle I/O to a given volume. As described above, the source volume servers 410 are used to store the volume data in either unencrypted or differently encrypted format from the target volume servers 415. The target volume servers 415 are used to store the encrypted copy of the volume received from the transform fleet 116.

As described above, the control plane 111 is a logical construct that can be implemented by at least one server 110 with computer-executable software for coordinating system and user requests and propagating them to the appropriate servers in the elastic computing system 120. The transform fleet 116 is a logical construct that handles encrypted new volume creation and can be implemented on internal servers of the elastic computing system 120 (e.g., servers that are not accessible to the user devices 130 but that are in data communication with the servers of the elastic computing system 120). The transform fleet 116 can be considered as part of the control plane 111, however it may be implemented on a distinct set of servers 115. The intermediary servers 115 of the transform fleet 116 can be configured not to accept connection requests from the client 420, in order to maintain security of the encryption keys stored on those servers.

The key manager 405 is also a logical construct that can be implemented on internal servers of the elastic computing system 120 in order to generate and manage cryptographic keys. For example, the key manager 405 can generate an encryption key based on master key or customer master key ("CMK"), and then can allow authorized entities to obtain the encryption key. A CMK is an encryption key generated from certain user-provided data that is then stored in association with that user account. The key manager 405 manages assigning key-value pairs and grants for the encryption process. A key-value pair refers to a key identifier for an encrypted key, and serves as a validation mechanism for entities within the elastic computing system 120 trying to access the key. For example, a key-value pair of {"key name":"encryption by default key"} could be used to name the encryption key, and this name can be recorded when the key is used in order to track its usage. A grant is a token that enables a particular identity within the elastic computing system 120 to use a master key or CMK, or to gain access to the plaintext content of a key.

Generally, interactions (1) through (10) represent an encryption state modification setup phase, interactions (11) through (19) represent the reattachment protocol of the client 320, interactions (20) through (24) represent the hydration process (e.g., the process by which the target is hydrated or provided with data of the source volume), and interactions (25) through (29) represent how the client 420 handles user I/O using the new encrypted copy of the volume data. With reference initially to FIG. 4A, a first portion of illustrative interactions 400 are depicted for volume encryption state modification. The interactions of FIG. 4A begin at (1), where the user 425 submits a request to the control plane 111 to modify the encryption state of an existing volume. While the control plane 111 may receive the initial request to create the new volume and configure entities within the computing system for the state modification, the transform fleet 116 performs additional functions beyond the control plane 111, where these additional functions relate to the encryption of data.

In response to the request, at (2) the control plane 111 obtains the source volume ID and identifies the CMK that will be used in the hydration process. If the user has not specified a CMK that control plane 111 can create an encryption key for use with this user account. At (3) the control plane 111 sends a request to the key manager 405 to create an encryption key and grant for encrypting the target volume. Initially, the encryption key may be encrypted for heightened data security. A grant enables decryption of the encrypted key, and specifically enables the control plane 111 to programmatically delegate the use of encryption keys from the key manager 405 to other components of the elastic computing system 120, for example the transform fleet 116 and the client 320. Typically, a grant expires after one use. Accordingly, at (4) the key manager 405 returns an encrypted encryption key and grant to the control plane 111. In implementations in which the source volume is also encrypted, interactions (3) and (4) can be repeated to obtain the encryption key and grant for the source volume.

At interaction (5), the control plane 111 instructs the transform fleet 116 to create a transform instance with the volume ID of the source and target volumes and with the encryption context. In response, at (6) the transform fleet 116 loads the encryption context and calls the key manager 405 to decrypt the encrypted encryption key. As described above, the key manager 405 can restrict access to keys to authorized/authenticated identities within the elastic computing system 120. Accordingly, the transform fleet 116 can be assigned an authenticated identity (e.g., by the control plane 111). This identity can assume a role on behalf of user requests to create encrypted volumes and further decrypt the data encryption key encrypted with the user's CMK. When the transform fleet 116 assumes a role, a temporary user (principal) can be created which is specific to the volume's context (i.e. the principal created during assuming role for volume1 will be different than the principal created while assuming role for volume2). This provides a validation such that the transform fleet 116 acting on behalf of a volume doesn't accidently mix-up data from different volumes. The grant token created by the key manager 405 can be for this identity, such that no other account can use this grant to access the key.

Based on the authorized identity of the transform fleet 116 server, the key manager 405 decrypts the encrypted encryption key and sends the unencrypted (plaintext) key (referred to as the "data key") back to the transform fleet 116 at (7). The transform fleet 116 can store the data key into memory for later use. For example, the transform fleet 116 can store the key in a volatile memory such as a non-persistent metadata cache in some implementations. As such, the data key will remain in memory while the transform fleet 116 server is powered on, but will be deleted when the server is powered off (e.g., during a periodic re-boot). Other implantations can use alternative storage strategies to ensure security. For example, the data key can be stored in a TPM, an encrypted software container, etc. This may be done for the target volume data key and the source volume data key in re-encryption implementations. Once the transform instance is created and configured with the key(s), the transform fleet 116 sends confirmation to the control plane 111 at interaction (8).

Next, at interactions (9) and (10) the control plane 111 configures the hardware of one or more block store servers 105 for storing the target volume (depicted as the target volume servers 415). As illustrated by the dashed box labeled "for each partition," interactions (9) and (10) are performed for each partition of the volume, iteratively or in parallel. As described above, volumes may be partitioned a number of times, for example up to 16. At (9), the control plane 111 creates the partition on one of the target volume servers 415. This partition stores the volume ID as well as the ID of the instance of the transform fleet 116 that will perform encryption. At (10), the target volume server 415 sends a server available acknowledgement back to the control plane 111 to indicate that it has successfully stored the volume ID and transform instance ID.

Turning to FIG. 4B, at (11), the control plane 111 can send an alert to the client 420 indicating that the state of the volume and thus its metadata (e.g., volume ID, storage location, and an encryption parameter indicating the encryption state, among others) have changed. In response, at (12) the client to the client 420 can request the updated volume metadata from the control plane 111. Having the client 420 request the information rather than simply providing the information can be done to address security of the volume data. In response, at (13) the control plane 111 can send the updated volume metadata representing the configuration on the target servers 415 to the client 420.

At (14), the client 420 can use this information to delete its volume state of currently stored volume attributes (including the encryption parameter, which would reflect the encryption state of the source). As described herein, the client 420 may persist certain metadata of an attached volume in local storage in order to facilitate interactions with the volume. The client 420 can then rebuild the volume state by populating values for the attributes based on the updated information received from the control plane 111. This can include flipping the encryption state of the encryption parameter, which can entail flipping the state from unencrypted to encrypted, or flipping the state from one encryption context to another.

In response to refreshing the volume metadata, at (15) the client 420 can reach out to the key manager 405 to request the encryption key corresponding to the updated state of the target volume and a grant to use the encryption key. The key manager 405 may verify that the client 420 is an authorized identity to access the encryption information, for example based on communications with the control plane 111. In response, at (16) the key manager 405 can send the encryption key and grant to the client 420. At (17) the client 420 loads the encryption context and calls the key manager 405 to decrypt the encrypted encryption key. Based on the authorized identity of the client 420, the key manager 405 decrypts the encrypted encryption key and sends the unencrypted (plaintext) key back to the client 420 at (18). The client 420 can persist this information in secure storage (e.g., a TPM) for use in decrypting the target volume to handle user I/O. After completing the volume state refresh and obtaining the encryption key, at (19) the client 420 can attach to the target volume (e.g., store data identifying and designating the target volume for handling user I/O).

Turning now to FIG. 4C, a third subset of the interactions 400 are depicted relating to block data encryption and use of the encrypted target volume for handling user I/O. As indicated above, interactions (20) through (24) can be performed to hydrate the target volume from the source volume. As illustrated by the dashed box labeled "for each block," interactions (20) through (24) are performed for each block of the volume, iteratively or in parallel. When the target volume server 415 is asked to create the target volume, it can be told to fetch data from the transform fleet 116. Thus, at (20) the target volume server 415 sends a get block request to the transform fleet 116.

At (21), the transform fleet 116 can request the data of the block from the source volume servers 410, which can return the data of the block to the transform fleet 116 at (22). Thereafter, at (23) the transform fleet 116 loads the plaintext encryption key(s) to perform encryption (e.g., using the encryption key specified for the target volume to encrypt) or re-encryption (e.g., using the encryption key specified for the source volume to decrypt, and then using the encryption key specified for the target volume to encrypt). Thereafter, at (24) the transform fleet 116 responds with a send block response that provides the target volume server 415 with the encrypted data of the requested block.

Interactions (25) through (29) represent the client 420 handling user I/O with respect to the volume. At (25), the client 420 sends a block request to the target volume servers 415, for example to read the data of the block and/or perform a write to the data of the block. At (26), the target volume servers 415 respond by sending the requested block to the client 420.

Because the target volume is encrypted, the client 420 must decrypt the block to perform the I/O operation on its data. Thus, at (27) the client 320 can use the plaintext key to decrypt the data of the block. Thereafter, the client 320 can perform the desired operation (e.g., read or write) on the block. This can involve providing the unencrypted block data over a network 125 to a user device 130 in some implementations. If a write is performed, the client 320 can also re-encrypt the updated block data at (28) using the plaintext key, and can send the updated encrypted block back to the target volume server 415 at (29).

User I/O can continue as the target volume is being created, and thus interaction (25) may occur while the target volume is still in the process of hydration from the source volume. As such, the requested block may not be available on the target volume servers 415. If the requested block is not available, this can trigger a get fault. In response to a get-fault, the target volume servers 415 may reach to transform fleet 116 for the block data, and encryption and transmission of the block can occur as described with respect to interactions (20) through (24) above in order to populate the target volume servers 415 with the block data to send the block response at interaction (26).

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computing system, comprising:
a first set of servers configured to host a block storage volume representing a virtual hard drive of a computing device, wherein the block storage volume has an encryption state indicating that the block storage volume is either encrypted or un-encrypted;
a second set of servers configured to host an encrypted version of the block storage volume, wherein the encrypted version has a second encryption state indicating that the encrypted version is encrypted using an encryption key;
a control plane system including one or more first processors coupled to one or more first memories, the first memories including first computer-executable instructions that, upon execution, cause the control plane system to:
receive a request to modify the encryption state of the virtual hard drive the second encryption state, and
configure the second set of servers to host the encrypted version of the block storage volume;
a transform fleet including one or more second processors coupled to one or more second memories, the second memories including second computer-executable instructions that, upon execution, cause the transform fleet to:
receive at least some of the blocks of the block storage volume from the first set of servers,
perform encryption on the at least some of the blocks using the encryption key associated with the second encryption state, and
send the at least some of the blocks, as encrypted using the encryption key, to the second set of servers; and
a client including one or more third processors coupled to one or more third memories, the third memories including third computer-executable instructions that, upon execution, cause the client to:
create a first network connection to the block storage volume hosted on the first set of servers attach the client to the block storage volume hosted on the first set of servers, wherein the client is configured enable the block storage volume to act as the virtual hard drive for the computing device by handling input output ("I/O") operations submitted to the virtual hard drive by the computing device, wherein the client stores persistent data representing an encryption state of the virtual hard drive, and wherein the encryption state of the virtual hard drive initially matches the encryption state of the block storage volume acting as the virtual hard drive for the computing device,
in response to receiving, from the control plane system, an indication that the encryption state of the virtual hard drive has been modified, create a second network connection to the encrypted version of the block storage volume to attach the client to the encrypted version of the block storage volume hosted on the second set of servers to enable the encrypted version of the block storage volume to act as the virtual hard drive for the computing device, wherein the client updates the data representing the encryption state of the virtual hard drive to represent the second encryption state, and
use the encryption key to handle the I/O operations from the computing device to the virtual hard drive via the encrypted version of the block storage volume.

2. The computing system of claim 1, further comprising a key manager including one or more fourth processors coupled to one or more fourth memories, the fourth memories including fourth computer-executable instructions that, upon execution, cause the key manager to:
confirm the transform fleet as a first entity authorized to access the encryption key;
confirm the client as a second entity authorized to access the encryption key; and
provide the encryption key to the transform fleet and the client.

3. The computing system of claim 1, wherein the encryption state of the block storage volume indicates that the block storage volume is unencrypted, and wherein the transform fleet encrypts the at least some blocks of the block storage volume to create the encrypted version of the block storage volume.

4. The computing system of claim 1, wherein the encryption state of the block storage volume indicates that the block storage volume is encrypted using another encryption key that is different than the encryption key associated with the second encryption state, and wherein the transform fleet re-encrypts the at least some blocks of the block storage volume to create the encrypted version of the block storage volume.

5. A computer-implemented method, comprising:
attaching a client to a block storage volume stored on a first set of servers to enable the block storage volume to act as a virtual hard drive for a computing device, wherein the client is configured handle user input and output ("I/O") operations to the virtual hard drive received from the computing device by interaction with the block storage volume, and wherein the client stores persistent data representing an encryption state of the virtual hard drive;
receiving a request to modify the encryption state of the virtual hard drive to a new encryption state;
configuring a second set of servers to store an encrypted version of the block storage volume with the new encryption state, the encrypted version storing data of the block storage volume as encrypted using an encryption key associated with the new encryption state;
performing encryption on the data using the encryption key associated with the new encryption state to result in encrypted data;
sending the encrypted data to the second set of servers;
modifying the encryption state of the virtual hard drive to reflect the new encryption state;
responsive to modifying the encryption state of the virtual hard drive to reflect the new encryption state, reattaching the client to the virtual hard drive, wherein reattaching the client to the virtual hard drive comprises attaching the client to the encrypted version of the block storage volume to enable the encrypted version of the block storage volume to act as the virtual hard drive for the computing device, and wherein reattaching the client to the virtual hard drive comprises updating the encryption state to represent the new encryption state; and
using the encryption key to decrypt the encrypted data to handle the user I/O operations to the virtual hard drive.

6. The computer-implemented method of claim 5, wherein the encryption state represents that the virtual hard drive is unencrypted prior to creation of the encrypted version of the block storage volume, and wherein modifying the encryption state of the virtual hard drive to reflect the new encryption state comprises modifying the encryption state from an unencrypted state to an encrypted state.

7. The computer-implemented method of claim 5, further comprising, by the client, requesting the encryption key in response to modifying the encryption state of the virtual hard drive to reflect the new encryption state.

8. The computer-implemented method of claim 5, wherein the encryption state is initially set to an initial encryption state that represents that the virtual hard drive is encrypted with another encryption key that is different than the encryption key associated with the new encryption state, and wherein modifying the encryption state of the virtual hard drive to reflect the new encryption state comprises modifying the encryption state from the initial encryption state to the new encryption state.

9. The computer-implemented method of claim 8, wherein the method further comprises, by the client:
deleting the another encryption key; and
requesting the encryption key.

10. The computer-implemented method of claim 5, wherein performing encryption on the data comprises performing the encryption using a transform fleet that receives the data from the first set of servers and sends the encrypted data to the second set of servers.

11. The computer-implemented method of claim 10, wherein the block storage volume is encrypted with another encryption key that is different than the encryption key associated with the new encryption state, the computer-implemented method further comprising, by the transform fleet:
storing the encryption key and the another encryption key at the transform fleet; and
using the another encryption key to decrypt a block of the data of the block storage volume, and
using the encryption key to re-encrypt the block.

12. The computer-implemented method of claim 10, further comprising
confirming the transform fleet as a first entity authorized to access the encryption key;
confirming the client as a second entity authorized to access the encryption key; and
providing the encryption key to the transform fleet and the client.

13. The computer-implemented method of claim 5, further comprising rebuilding the encryption state of the virtual hard drive for reattaching the client to the virtual hard drive by querying a control plane for metadata of the virtual hard drive.

14. A non-transitory computer-readable medium comprising computer-executable instructions that, when executed on a computing system, cause the computing system to implement a client configured handle user input and output ("I/O") operations between a computing device and a virtual hard drive, wherein to implement the client, the computer-executable instructions cause the computing system to perform operations comprising:
attaching the client to a block storage volume to enable the block storage volume to act as the virtual hard drive for the computing device, wherein attaching includes storing persistent data representing an encryption state of the virtual hard drive;
determining that the encryption state of the virtual hard drive has been modified to a new encryption state by creation of an encrypted version of the block storage volume using an encryption key;
reattaching the client to the virtual hard drive, wherein reattaching the client to the virtual hard drive comprises attaching the client to the encrypted version of the block storage volume to enable the encrypted version of the block storage volume to act as the virtual hard drive for the computing device;
updating the persistent data to represent the new encryption state associated with the encryption key; and
using the encryption key to handle the user I/O operations to the virtual hard drive by conducting the user I/O operations against the encrypted version.

15. The non-transitory computer-readable medium of claim 14, the operations further comprising:

receiving an indication from a control plane to use the encrypted version of the v block storage volume to handle the user I/O operations;

wherein the computer-executable instructions cause the computing system to reattach the client to the encrypted version of the block storage volume to enable the encrypted version of the block storage volume to act as the virtual hard drive for the computing device in response to receiving the indication.

16. The non-transitory computer-readable medium of claim 15, the operations further comprising requesting and receiving an encryption context of the encrypted version of the block storage volume from the control plane, the encryption context identifying the encryption key.

17. The non-transitory computer-readable medium of claim 16, the operations further comprising requesting a plaintext version of the encryption key from a key manager in response to receiving the encryption context from the control plane.

18. The non-transitory computer-readable medium of claim 17, the operations further comprising storing the plaintext version of the encryption key in a secure memory, and using the plaintext version of the encryption key to handle the user I/O operations.

19. The non-transitory computer-readable medium of claim 15, wherein the computer-executable instructions cause the computing system to determine that the encryption state of the virtual hard drive has been modified based on receiving an indication from a control plane that a state of the virtual hard drive has changed.

20. The non-transitory computer-readable medium of claim 19, the operations further comprising rebuilding metadata representing a state of the virtual hard drive based on information received from the control plane, the state of the virtual hard drive including the encryption state.

* * * * *

UNITED STATES PATENT AND TRADEMARK OFFICE
CERTIFICATE OF CORRECTION

PATENT NO. : 10,867,052 B1
APPLICATION NO. : 16/141689
DATED : December 15, 2020
INVENTOR(S) : Kumar et al.

Page 1 of 1

It is certified that error appears in the above-identified patent and that said Letters Patent is hereby corrected as shown below:

On the Title Page

On page 2, in Column 1, item (56), Other Publications, Line 4, delete "developergide" and insert --developerguide--.

In the Claims

In Column 16, Line 30, Claim 1, delete "configured enable" and insert --configured to enable--.

In Column 17, Line 19, Claim 5, delete "configured handle" and insert --configured to handle--.

In Column 18, Line 26, Claim 12, delete "comprising" and insert --comprising:--.

In Column 18, Line 41, Claim 14, delete "configured handle" and insert --configured to handle--.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*